United States Patent [19]

Rattmann

[11] Patent Number: 4,913,468
[45] Date of Patent: Apr. 3, 1990

[54] TUBE UNION REINFORCING CLIP

[75] Inventor: Hans R. Rattmann, Burlington, Canada

[73] Assignee: Eaton Corporation, Cleveland, Ohio

[21] Appl. No.: 337,797

[22] Filed: Apr. 13, 1989

[51] Int. Cl.[4] ............................................. F16L 35/00
[52] U.S. Cl. ...................................... 285/82; 285/114
[58] Field of Search ............................ 285/114, 82, 45

[56] References Cited

U.S. PATENT DOCUMENTS

| 874,378 | 12/1907 | Allen | 285/114 |
|---|---|---|---|
| 883,220 | 3/1908 | Middlebrook | 285/114 |
| 1,310,627 | 7/1919 | McEvilly | 285/114 |
| 3,881,753 | 5/1975 | Bochovy | 285/82 |
| 4,082,094 | 4/1978 | Dailey | 285/114 |
| 4,109,941 | 8/1978 | Wood et al. | 285/114 X |

Primary Examiner—Thomas F. Callaghan
Attorney, Agent, or Firm—A. E. Chrow

[57] ABSTRACT

A clip (60) is provided for holding a union (50) joining two tubes (34, 36) together. Clip (60) has a pair of spaced-apart plate members (4,6) integrally joined at one end (10) for receiving union (50) therebetween with plate members (4,6) having respective slots (14,12) for receiving the tubes thereto. Plate members (4,6) have at least one resilient arm (16) operative to hold the tubes in the slots and at least one latch member (18) is provided for bridging across slots (14,12) and holding plates (4,6) against union (50).

7 Claims, 1 Drawing Sheet

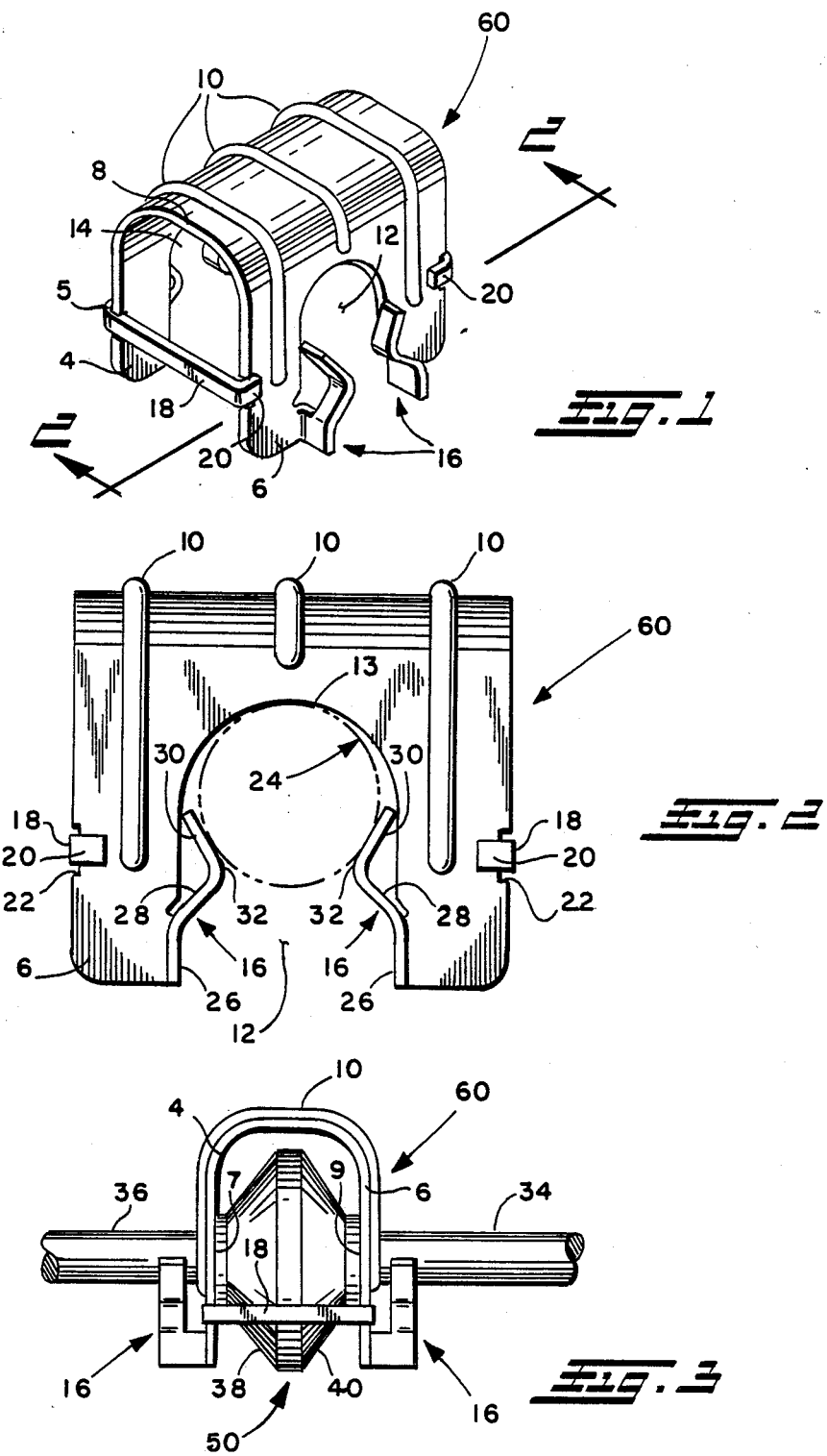

TUBE UNION REINFORCING CLIP

INTRODUCTION

This invention relates generally to a clip for reinforcing a union or junction between two tubes against separation and more particularly to a clip that is operative to reinforce a pair of substantially axially aligned tubes against separation at an enlarged union or junction such as a coupling or fitting therebetween.

BACKGROUND OF THE INVENTION

Tubes are commonly employed to convey unpressurized or pressurized fluids from one point to another such as for example in an air conditioning system where the tubes are used to carry both gaseous and liquid forms of the cooling medium.

Tubes are also commonly joined together at their ends by couplings or fittings to extend the length of their run or where two tubes having different diameters are joined together for a particular purpose.

Such couplings or fittings may be either of the permanently attached or reusable type well know to those skilled in the art. Generally reusable fittings employ threaded male and female members that are threaded together to make the connection between the tubes or which includes brazing or soldering a male and female member together and permanently attached fittings commonly employ a sleeve which is crimped or swaged to make a permanent connection between the tubes.

Such union or junction between the tube ends introduces a potential point of separation between the tubes, should impact vibration, or temperature variation loosen the couplings or in cases where an axial load is applied to the tubes that is sufficient to cause the tubes to separate at the union or junction.

In light of the foregoing, a need has existed to provide simple, low cost means for reinforcing a union or junction between two substantially axially aligned tubes against separation.

SUMMARY OF THE INVENTION

Accordingly, it is an object of this invention to provide a clip that is adapted to reinforce a union or junction between a pair of tubes against separation.

It is another object of this invention to provide a clip that is operative to bridge across the union or junction between two tube ends and is effective to reinforce the tubes against separating at the union or junction.

It is still another object of this invention to provide a clip that is low cost and simple in construction and that can be easily attached so as to bridge across an enlarged union or junction between a pair of tubes and effectively reinforces the union or junction from separating.

BRIEF DESCRIPTION OF THE DRAWINGS

FIG. 1 is a perspective view of a clip 60 of the invention;

FIG. 2 is a view of clip 60 taken along view line 2—2 of FIG. 1; and

FIG. 3 is a side view of clip 60 of FIG. 1 being used to reinforce a union 50 between tubes 34 and 36 against axial separation.

DESCRIPTION OF SOME PREFERRED EMBODIMENTS

In FIG. 1, clip 60 has a pair of substantially parallel plate members 4 and 6 that are integrally connected at end 8 and are spaced-apart from each other for a distance sufficient to receive a tube union or coupling (such as coupling 50 of FIG. 3) therebetween with the facing surfaces in predetermined proximity to opposite sides of coupling 50 (referenced by numerals 7 and 9 in FIG. 3) that face away from each other along one of tubes 34 and 36.

Plate members 4 and 6 are preferably provided by bending a single plate into a "U" shaped configuration.

Plates 4 and 6 preferably include at least one reinforcing rib 10 that extends between plates 4 and 6 across end 8 to enhance the ability of clip 60 to reinforce coupling 50 against axial separation.

Plate members 4 and 6 have respective open-ended slots 12 and 14 therethrough that are in substantial alignment. Slots 12 and 14 are adapted to receive tues 34 and 36 of FIG. 3 thereinto as hereinafter described.

Each of plate members 4 and 6 include at least one resilient arm or finger referenced by numeral 16 that is operative to be engaged by the tubes as they enter the open-end of slots 14 and 16 and thence to yield to enable the tubes to move therealong towards the closed end of the slots and thence to urge the tubes against the edge of plates 4 and 6 defining the closed-end of slots 12 and 14 which for slot 12 is referenced by numeral 13 in FIG. 2.

Clip 60 includes means for releasably latching plate members 4 and 6 together once clip 60 has been pressed onto the tubes with the union disposed intermediate plates 4 and 6 and the respective tubes are held against the closed end of slots 12 and 14.

The latching means is preferably provided by strap member 18 disposed on at least one side and preferably both sides of clip 60 as shown in FIGS. 1 and 3.

Strap member 18 is hinged at an end to one of plate members 4 and 6 (preferably by being integral therewith) and is operative to extend from one plate member across the space between the plate members to the other plate member and end in a free end that is bent to provide tab 20 that is operative to extend around the edge of the other plate member and engage the side thereof facing away from the union so as to urge the plate members towards each other and against the sides of the union respectively facing theretowards.

As shown in FIG. 2, the edge of the member that is engaged by tab 20 preferably includes a notch 22 therein that is registerable with a section of strap member 18 adjacent tab 20 and is adapted to receive the section thereinto.

In the preferred embodiment of resilient arms 16 shown in FIG. 2, arms 16 have respective first sections 26 that extend in substantial parallel relationship to each other transversly from plate member 16 on opposite sides of slot 12 adjacent the open end thereof. Arms 16 have respective second sections 28 that extend towards each other from their first sections in a direction towards closed end 13 of slot 12. Arms 16 have a third section that extend from their second sections away from each other towards closed end 13 of slot 12 and end in respective free-ends (not referenced).

The intersection between the second and third sections provides spaced-apart knees 32 shown in FIG. 2. Knees 32 are spaced-apart from each other a distance less than the diameter of the tube to be received into slot 12 such as, for example, tube 24 referenced by dashed lines in FIG. 2.

In operation, when clip 60 is pressed onto the tubes with the union received into the space between plate members 4 and 6, the tubes respectively engage second sections 28 which then yield enabling knees 32 to spread apart from each other enabling the tubes to move along the slots towards the respective closed-ends thereof and thence third sections 32 engage and urge the tubes against the edge of the plate members defining the closed-end of the slots after which strap member(s) 18 are bent such that their tabs 20 engage and urge the plate members together against the opposite sides of the union respectively facing theretoward to provide the reinforcement against separation thereat.

FIG. 3 shows clip 60 being used to reinforce coupling or fitting 50 between tubes 34 and 36 in an air conditioning application. Coupling 50 has a male member 38 and a female member 40 (or vice versa) that are respectively secured to tubes 34 and 36.

Clip 60 has been pressed downwardly such that coupling 50 is received into the space between plate members 4 and 6, resilient arms 16 press the tube against the closed end of the slots disposed respectively through plate members 4 and 6, and strap member(s) 18 have been bent into position to releasably lock the plate members together to reinforce coupling 50 against separation as previously described.

The clip of the invention is preferably a one-piece construction formed and folded from a material having suitable strength, resilience and other properties desired for a particular application.

In an air conditioning application involving tubes having air outside diameter of ⅜ to ⅝ inch, it has been found advantageous to make the clip from tempered steel sheet having a thickness of about 0.035 inch.

In instances where the connected tubes have the same diameter, the slots in the plate members and the resilient arms may be substantially identical enabling the clip of the invention to be used universally without particular orientation to either tube.

In instances where the connected tubes have different diameters, the slot and resilient arms may be adapted accordingly to accommodate for the difference in diameter.

What is claimed is:

1. A clip for reinforcing an enlarged union between a pair of substantially axially aligned tubes against separation, said union having opposite sides respectively facing away from each other along each tube, and said clip comprising;
    a pair of substantially parallel plate members integrally joined at one end and spaced-apart from each other sufficiently to receive the union therebetween with opposed facing surface thereof in predetermined proximity to the side of the union respectively facing theretowards,
    a slot through each of the plate members, said slots substantially aligned with each other and respectively having a closed-end and an open-end adapted to receive thereinto the tube in registration therewith when the union is received between the plate members,
    at least one resilient arm extending from each plate member, said arms respectively operative to engage the tubes upon receipt thereof in the slot open-ends and to yield sufficiently to enable the tubes to move therealong towards the respective closed-ends thereof and thence to resiliently urge the tubes against an edge of the plate member defining the closed-end of the slots, and
    latching means operative to bridge across the union and releasably secure the plate members together such that they are able to engage the respective union side in proximity thereto and provide the reinforcement against axial separation between the tubes.

2. The clip of claim 1 having two of the resilient arms extending from each of the plate members, said arms extending from the plate member on opposite sides of the slots extending therethrough adjacent the open-end thereof.

3. The clip of claim 2 wherein the arms have corresponding first sections that respectively extend away from a side of the plate member facing away from the union in substantial parallel relationship with each other and corresponding second sections that respectively extend from the first sections angularly towards each other in a direction towards the closed-end of the slot and corresponding third sections that respectively extend from the second sections angularly away from each other in a direction towards the closed-end of the slot to respective free-ends thereof, said second and third sections defining respective knees at the intersection therebetween that are spaced-apart from each other a distance less than the outside diameter of the tube to be received into the slot, said second section operative to be engaged by the tube and to yield sufficiently to enable the tube to move between the knees towards the closed-end of the slot, and said third sections operative to urge the tube against the edge of the plate member defining the closed-end of the slot.

4. The clip of claim 1 wherein the plate members include at least one rib extending from one plate member to the other plate member across the junction therebetween that is adapted to strengthen the junction and cooperate with the latching means to provide the reinforcement against separation between the tubes.

5. The clip of claim 1 wherein the latching means comprises at least one strap member having one end secured to one of the plate members and having an opposite end bent to provide a tab operative to engage a side of other plate member facing away from the union.

6. The clip of claim 5 having two of said strap members respectively disposed on opposite sides of the plate member slots.

7. The clip of claim 5 or 6 wherein the plate members include a notch in an edge thereof operative to register with and receive a section of the strap members thereinto adjacent the tabs.

* * * * *